(12) United States Patent
Krumhansl et al.

(10) Patent No.: US 8,663,361 B1
(45) Date of Patent: Mar. 4, 2014

(54) METHODS OF RECOVERING ALKALI METALS

(75) Inventors: James L. Krumhansl, Albuquerque, NM (US); Mark J. Rigali, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 180 days.

(21) Appl. No.: 13/096,751

(22) Filed: Apr. 28, 2011

Related U.S. Application Data

(60) Provisional application No. 61/331,915, filed on May 6, 2010.

(51) Int. Cl.
*C22B 26/10* (2006.01)
*B01D 11/04* (2006.01)

(52) U.S. Cl.
USPC ............... 75/743; 75/745; 423/208; 210/610; 210/679

(58) Field of Classification Search
USPC ............... 75/745, 743; 423/208; 210/670, 679
See application file for complete search history.

(56) References Cited

U.S. PATENT DOCUMENTS

| | | | |
|---|---|---|---|
| 6,110,378 A | 8/2000 | Anthony et al. | |
| 6,436,294 B2 * | 8/2002 | Lundquist | 210/674 |
| 6,479,427 B1 | 11/2002 | Anthony et al. | |
| 6,482,380 B1 * | 11/2002 | Nenoff et al. | 423/326 |
| 2006/0041043 A1 * | 2/2006 | Mann et al. | 524/116 |

OTHER PUBLICATIONS

Ralph, Jolyon et al. "Pharmacosiderite." Mineral Information and Data. N.p., 1993. Web. Feb. 5, 2013. From http://www.mindat.org/min-3185.html.*

Ralphy, Jolyon et al. "Sitinakite". Mineral Information and Data. N.p., 1993. Web. Feb. 5, 2013. From http://www.mindat.org/min-3677.html.*

Ye, Xiushen et al., "Rubidium and cesium ion adsorption by an ammonium molybdophosphate-calcium alginate composite adsorbent," Colloids and Surfaces A: Physicochemical and Engineering Aspects, 342 (2009) pp. 76-83.

Tomasberger, Tanja et al., "Radiocesium removal from high level liquid waste and immobilisation in sodium silicotitanate for geological disposal," Radiochim. Acta 89, pp. 145-149 (2001).

Nesterenko, Valery P., "Use of ion-exchange composites based on natural zeolites for cleaning of water solutions with purpose to create environmentally safe technologies," Proceedings of European Congress of Chemical Engineering (ECCE-6), pp. 16-20, Sep. 2007.

Nakahara, H. et al., "Environmental Effects of Geothermal Waste Water on the Near-By River System," Journal of Radioanalytical Chemistry, vol. 45 (1978) pp. 25-36.

Miller, James E., "Development and Properties of Crystalline Silicotitanate (CST) Ion Exchangers for Radioactive Waste Applications," Sandia Report SAND97-0771, printed Apr. 1997, 61 Pages.

(Continued)

*Primary Examiner* — George Wyszomierski
*Assistant Examiner* — Tima M McGuthry Banks
(74) *Attorney, Agent, or Firm* — Daniel J. Jenkins

(57) ABSTRACT

Approaches for alkali metal extraction, sequestration and recovery are described. For example, a method of recovering alkali metals includes providing a CST or CST-like (e.g., small pore zeolite) material. The alkali metal species is scavenged from the liquid mixture by the CST or CST-like material. The alkali metal species is extracted from the CST or CST-like material.

18 Claims, 4 Drawing Sheets

(56) References Cited

OTHER PUBLICATIONS

Benton, William et al., "Cesium formate fluid succeeds in North Sea HPHT field trials," Drilling Contractor, May/Jun. 2000, 2 Pages.
Kunin, Robert et al., "Ion Exchange," Review of Fundamental Developments in Analysis, vol. 34, No. 5, Apr. 1962, pp. 101-103.
Krumhansl, James L. et al., "Reactive barriers for 137Cs retention," Journal of Contaminant Hydrology 47 (2001) pp. 233-240.
Komarneni, S. et al., "Radiation Effects on a Zeolite Ion Exchanger and a Pollucite," Nuclear and Chemical Waste Management, vol. 4, pp. 335-338, 1983.
Celestian, Aaron J., "The Mechanism Responsible for Extraordinary Cs Ion Selectivity in Crystalline Silicotitanate," J. Am. Chem. Soc, 2008, 130 pp. 11689-11694.
Hodge, Evangeline M. et al., "Determination of inorganic cations in brine solutions by ion chromatography," Journal of Chromatography A, 884 (2000) pp. 223-227.
Hayashi, Hiromichi et al., "Temperature Dependence of Adsorption of Caesium Ions on Crystalline Hydrous Titanium Dioxide Fibers," The Chemical Society of Japan, Notes Bull. Chem. Soc. Jpn., 62, pp. 3716-3717 (1989).
Ames, Jr., L. L. et al., "Loading and Elution Characteristics of Some Natural and Synthetic Zeolites", Hanford Laboratories Operation, Aug. 10, 1962, 40 Pages.
Ames, Jr., L. L., "Mass Action Relationships of Some Zeolites in the Region of High Competing Cation Concentrations", The American Mineralogist, vol. 48, Jul.-Aug. 1963. 15 Pages.
Ames, Jr., L. L. "Some Zeolite Equilibria with Alkali Metal Cations", The American Mineralogist, vol. 49, Jan.-Feb. 1964, 19 Pages.
Bortun, Anatoly I. et al., "Synthesis, Characterization, and Ion Exchange Behavior of a Framework Potassium Titanium Trisilicate K2TiSi3O9H2O and Its Protonated Phases", Chem. Mater., 2000, 12, 12 Pages.
Butterman, William C. et al., "Cesium", Mineral Commodity Profiles, U.S. Geological Survey, Open-File Report 2004-1432, 2004, 13 Pages.
Butterman, W C. et al., "Rubidium", Mineral Commodity Profiles, U.S. Geological Survey, Open-File Report 03-045, Online Only, Version 1.0, Jul. 22, 2003, 11 Pages.
Cherry, Brian R. et al., "Investigation of cation environment and framework changes in silicotitanate exchange materials using solid-state 23Na, 29Si, and 133Cs MAS NMR", Journal of Solid State Chemistry, 177, 2004, 15 Pages.
Collins, A. G. "Flame Spectrophotometric Determination of Cesium and Rubidium in Oil Field Waters", Analytical Chemistry, vol. 35, No. 9, Aug. 1963, 4 Pages.
Egleson, G. C. et al., "Variation in the Composition of Brine from the Sylvania Formation near Midland, Michigan", Environmental Science & Technology, vol. 3, No. 4, Apr. 1969, 5 Pages.
Gomi, Shunji et al., "Selective Removal of Potassium and Caesium Ions from Brines That Pass through a Granular Sodium-form Taeniolite Packed Column", Nihon Kaisui Gakkaishi=Bulletin of the Society of Sea Water Science, Japan, vol. 52, Issue 3, 1998, 17 Pages.
Grant, D. C. et al., "Removal of Radioactive Contaminants From West Valley Waste Streams Using Natural Zeolites", Environmental Progress, vol. 6, No. 2, May 1987, 6 Pages.
Güçlü, K. et al., "Determination and preconcentration of natural and radio-cesium from aqueous solution", Journal of Radioanalytical and Nuclear Chemistry, vol. 259, No. 2, 2004, 3 Pages.
Hayashi, Hiromichi et al., "Selective Collection of Cesium from Geothermal Brine by Crystalline Hydrous Titanium Dioxide Fiber", 1989, 6 Pages.

\* cited by examiner

METHODS OF RECOVERING ALKALI METALS

CROSS-REFERENCE TO RELATED APPLICATIONS

This application claims the benefit of U.S. Provisional Application No. 61/331,915, filed May 6, 2010, the entire contents of which are hereby incorporated by reference herein.

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

TECHNICAL FIELD

Embodiments of the present invention are in the field of metals recovery, and, more particularly, relate to methods of recovering alkali metals.

BACKGROUND

The recovery of alkali metals from geothermal brines represents a resource that has yet to be exploited. At present, most of the commercially obtained sodium (Na) and potassium (K) comes from large-scale underground or solution mining of massive salt deposits found in evaporated basins. Ores are beneficiated by flotation, dissolution-recrystallization (with solar evaporation), heavy-media separations, or combinations of these processes.

On the other hand, trace amounts of lithium (Li) are commercially recovered from non-geothermal sources. The recovery process involves evaporative concentration and the unique (among the alkali elements) ability to precipitate the lithium as a relatively insoluble carbonate salt.

By contrast, both cesium (Cs) and rubidium (Rb) are typically produced commercially by "hard rock" mining of a relatively rare, highly differentiated derivative of granite, known as a pegmatite. Deposits are typically small and ore dressing generally involves dissolution in highly aggressive acid mixes followed by various chemical processes to separate Cs and Rb from the more abundant K, Na and Li that also are found in such rocks.

None of the approaches described above provides a pre-existing methodology which could be directly adapted to recovering Cs and Rb from geothermal brines. Instead, adding geothermal brines to the potential resource base for obtaining these elements requires looking beyond the current state-of-the-art in the mining industry. Environmental concerns, particularly those related to the nuclear industry, have provided a venue where significant advances in Cs (and, hence, Rb)-recovery technologies have been made.

Industry concerns range from issues of pre-concentrating ultra-trace $^{137}$Cs levels associated with fallout to issues of treating the rather significant amounts of radio-cesium associated with nuclear wastes. In aggregate, a wide variety of possibilities can be derived from the literature related to the recovery and treatment of radio-cesium. For example, numerous effective organic-based complexing agents and resins have been described with this application in mind. For each material, however, important issues remain to be addressed, such as thermal stability, ultimate uptake capacity, reversibility of sorption, selectivity for target metals over more abundant constituents dissolved in geothermal fluids, and cost.

Thus, further advancements are needed in the area of alkali metals recovery.

SUMMARY

Embodiments include methods of recovering alkali metals.

In an embodiment, a method of recovering alkali metals includes providing a CST or CST-like material. The alkali metal species is scavenged from the liquid mixture by the CST or CST-like material. The alkali metal species is extracted from the CST or CST-like material.

In another embodiment, a method of recovering alkali metals includes providing a liquid mixture comprising alkali metal species. The method also includes combining the liquid mixture with a CST or CST-like material. The method next includes extracting the alkali metal species from the CST or CST-like material.

DETAILED DESCRIPTION

Approaches for the recovery of alkali metals are described herein. In the following description, numerous specific details are set forth, such as reagents suitable for cesium and rubidium extraction, in order to provide a thorough understanding of embodiments of the present invention. It will be apparent to one skilled in the art that embodiments of the present invention may be practiced without these specific details. In other instances, well-known processing operations, such as sample preparation, are not described in detail in order to not unnecessarily obscure embodiments of the present invention. Furthermore, it is to be understood that the various embodiments shown in the figures are illustrative representations and are not necessarily drawn to scale.

As described in greater detail herein, a class of materials including crystalline silico-titanates (CSTs) and their structural relatives (e.g., "CST-like" including CST-like zeolite-type materials) are used in the capturing, recovering and purifying of high value alkali metals (principally Cs, Rb, K and Li) from brines, brine concentrates, industrial wastes and industrial byproducts. For example, these innovative materials may be used in methods for recovering Cs and Rb from scavenger materials loaded with Cs and Rb. In a specific example, recovery of Cs and Rb from geothermal brines is performed with the use of CST and CST-like materials. Embodiments of the present invention may include, but are not limited to identification of materials suitable for alkali metal recovery, the application of such materials, and the extraction of high value alkali metals and other valuable constituents that may be loaded onto or scavenged by CST or CST-like materials.

Figure 1:
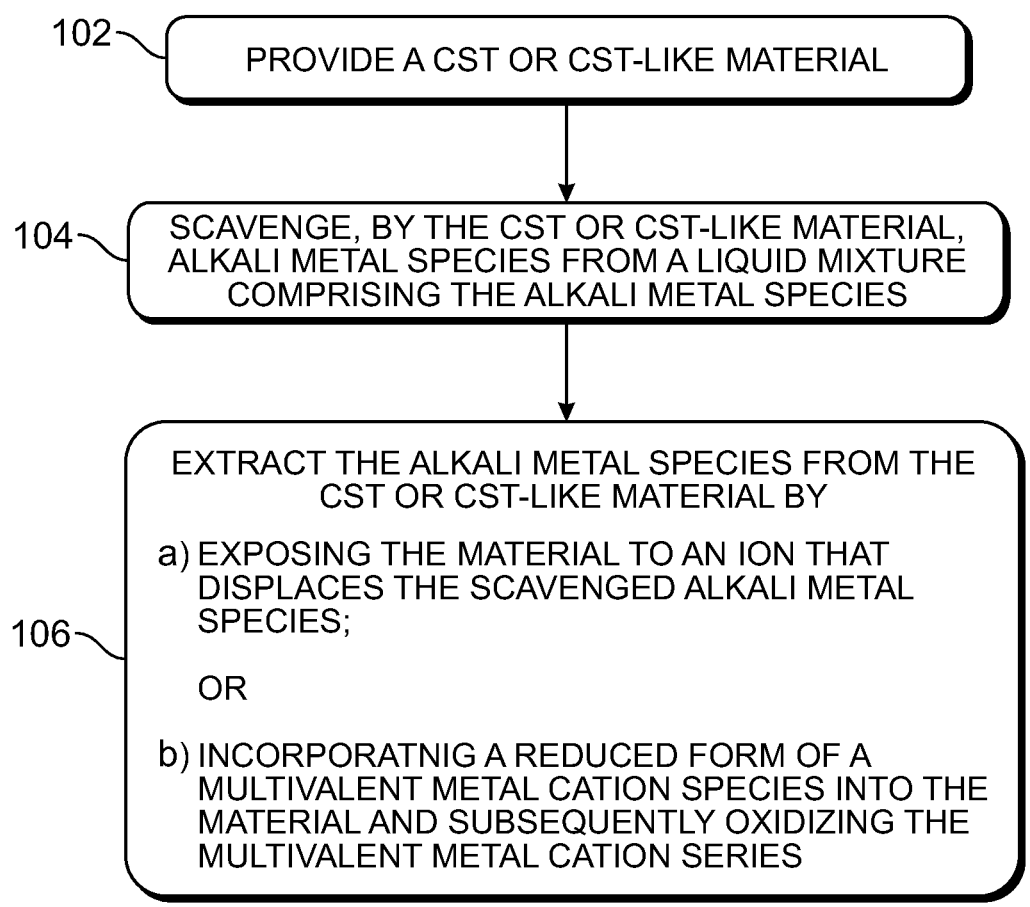
FIG. 1 depicts a flowchart representing an exemplary series of operations for recovering alkali metals, in accordance with an embodiment of the present invention.

In an aspect of the present invention, CST and CST-like materials are employed to recover and purify alkali metals. For example, FIG. 1 depicts a flowchart 100 representing an exemplary series of operations for recovering alkali metals, in accordance with an embodiment of the present invention.

Referring to operation 102 of flowchart 100, a method of recovering alkali metals includes providing a CST or CST-like material.

Figure 2A:
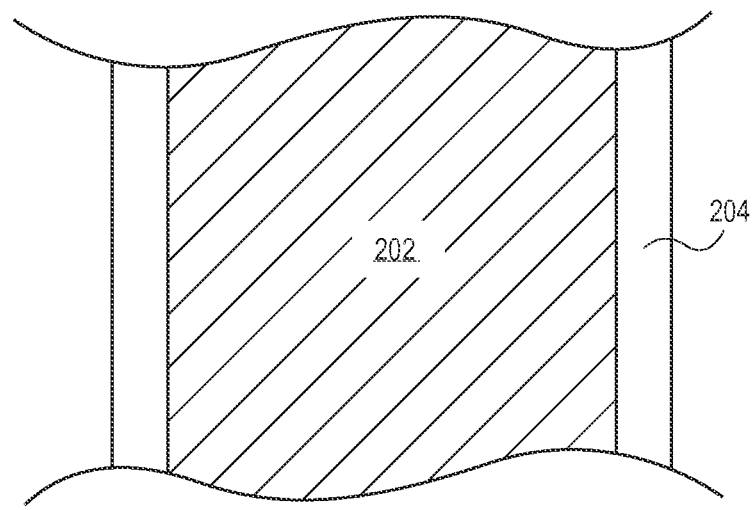
FIG. 2A illustrates a cross-sectional view of a CST or CST-like material provided in a separation column, in accordance with an embodiment of the present invention.

In an embodiment, the CST or CST-like material 202 is provided in a separation column 204, as depicted in FIG. 2A.

In an embodiment, the CST or CST-like material 202 are materials based on the crystal lattices of naturally occurring minerals such as pharmacosiderite and sitinakite, and composed of a framework made up principally of silicon, titanium, oxygen and the occasional inclusion of other metals such as niobium, and with exchangeable cations such as hydrogen ions, sodium ions, potassium ions, rubidium ions, and cesium ions.

In an embodiment, the CST or CST-like material 202 is an artificially prepared, commercially available crystalline silico-titanate material such as, but not limited to, UOP ION-SIV® IE-910 or IE-911. In one such embodiment, the artificially prepared, commercially available crystalline silico-titanate material is used as received. However, in another such embodiment, the artificially prepared, commercially available crystalline silico-titanate material is first acid washed, or base (or caustic) washed, or is prepared in another other specialized form by treatment with various chemicals or chemical mixtures. In a particular embodiment, the CST or CST-like material has the chemical composition $(Na,K,Rb,Cs,H)_{3-x}Nb_xTi_{4-x}Si_2O_{13}(OH) \cdot 4H_2O$.

In an embodiment, additional examples of compositional variations of suitable materials are described in U.S. Pat. Nos. 6,479,427 and 6,110,378, which are incorporated by reference herein. In one such embodiment, products derived from materials described in U.S. Pat. Nos. 6,479,427 and 6,110,378, e.g., materials obtained by various washing procedures, such as those described above, are also included in the scope of the present invention.

In an embodiment, other suitable CST-like materials include, but are not limited to, materials structurally related to the minerals sitinakite and pharmacosiderite, which are the natural mineral structural analogues for various synthetic CST-like materials such as IE-910. In one such embodiment, products derived from sitinakite and pharmacosiderite, e.g., materials obtained by various washing procedures, such as those described above, are also included in the scope of the present invention. In another embodiment, a zeolite-like material with high porosity and small pore size is used, such as but not limited to mordenite and chabazite.

Referring to operation 104 of flowchart 100, the method of recovering alkali metals also includes scavenging, by the CST or CST-like material, alkali metal species from a liquid mixture including the alkali metal species.

Figure 2B:
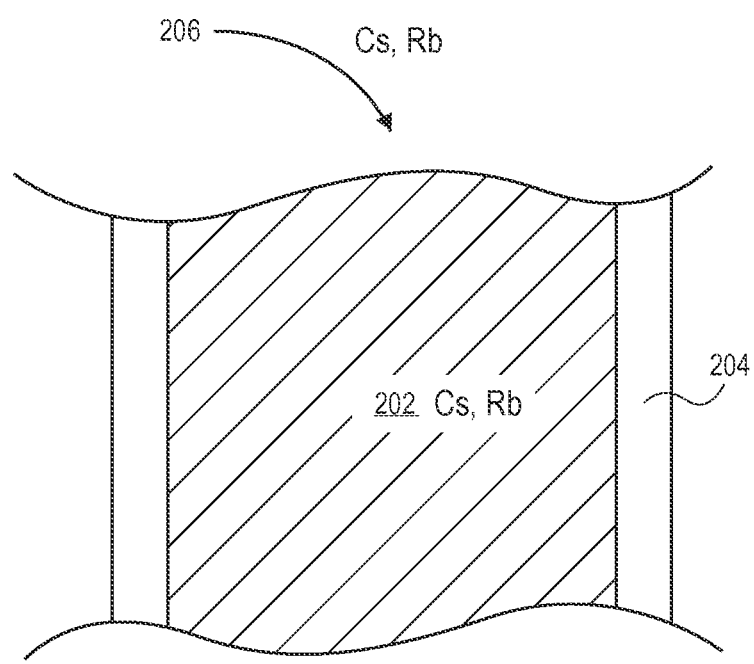
FIG. 2B illustrates a cross-sectional view of running a liquid mixture through a separation column loaded with the CST or CST-like material, in accordance with an embodiment of the present invention.

In an embodiment, scavenging, by the CST or CST-like material, alkali metal species from the liquid mixture including the alkali metal species includes running the liquid mixture 206 through the separation column 204 loaded with the CST or CST-like material 202, as depicted in FIG. 2B. In an embodiment, fully loaded CST or CST-like material includes approximately 20% by weight of Cs. However, in another embodiment, an approximately 10 parts per million (ppm) Cs solution only loads the CST or CST-like material with approximately 1% Cs.

In an embodiment, a CST or CST-like material is used to selectively scavenge, concentrate and purify high-value alkali metals (e.g., Li, K, Cs, and Rb) from fluids containing only very small concentrations of the target metals and from chemically complex fluids where other dissolved constituents greatly outweigh the metals being sought. In one such embodiment, a CST or CST-like material is used to treat a brine. In a specific such embodiment, the brine is a geothermal brine or a brine derived from geothermal power production activities. In another specific such embodiment, the brine is a natural brine such as, but not limited to, a brine obtained from a deep saline aquifer extracted for the purposes of hydrocarbon production, a brine obtained from solution mining operations that specifically target production of other economically valuable materials (e.g., halite, potassium, magnesium, lithium, etc.), a brine concentrated in surface evaporative ponds for the extraction of similar economically valuable constituents, a brine obtained in the course of constructing underground storage caverns, a brine composed of saline fluids produced in the course of chemical and waste water injection activities, a waste brine produced as a consequence of desalinization activities, or a brine extracted primarily to satisfy municipal and industrial water needs. In another embodiment, a natural brine such as sea water or saline lake water is used.

In another embodiment, a CST or CST-like material is used as an adjunct to achieving enhanced purification or recovery of alkali metals during conventional mining and mineral purification processes used for the commercial production of Li, K, Rb, and Cs.

In another embodiment, a CST or CST-like material is used to recover (trace amounts) of $^{137}$Cs used as markers in the transport of petroleum in pipelines and other industrial processes.

In another embodiment, a CST or CST-like material is used for the recovery and purification of high value alkali metals employed in various drilling applications, such as recovering or purifying the cesium from cesium formate which occasionally is employed to formulate high-density drilling fluids used to control blowouts, employed in freeing stuck drill stems (and casing), or employed in disaggregating plugs and other related drilling operations.

In another embodiment, a CST or CST-like material is used to maintain and clean contaminated fluids that arise during the course of nuclear power production and spent fuel storage.

In another embodiment, a CST or CST-like material is used in the recovery of radio-cesium (and other radioisotopes) from groundwaters, river waters, lake waters and sea or ocean waters which have been contaminated as a consequence of leakage from nuclear facilities.

In another embodiment, a CST or CST-like material is used as a component in the development of sensors for dissolved high-value alkali metals or to detect the presence of radio cesium in groundwaters, river waters, lake waters and sea or ocean waters or fluids that are associated with nuclear power production and spent fuel storage.

Referring to operation 106 of flowchart 100, the method of recovering alkali metals also includes extracting the alkali metal species from the CST or CST-like material.

Figure 2C:
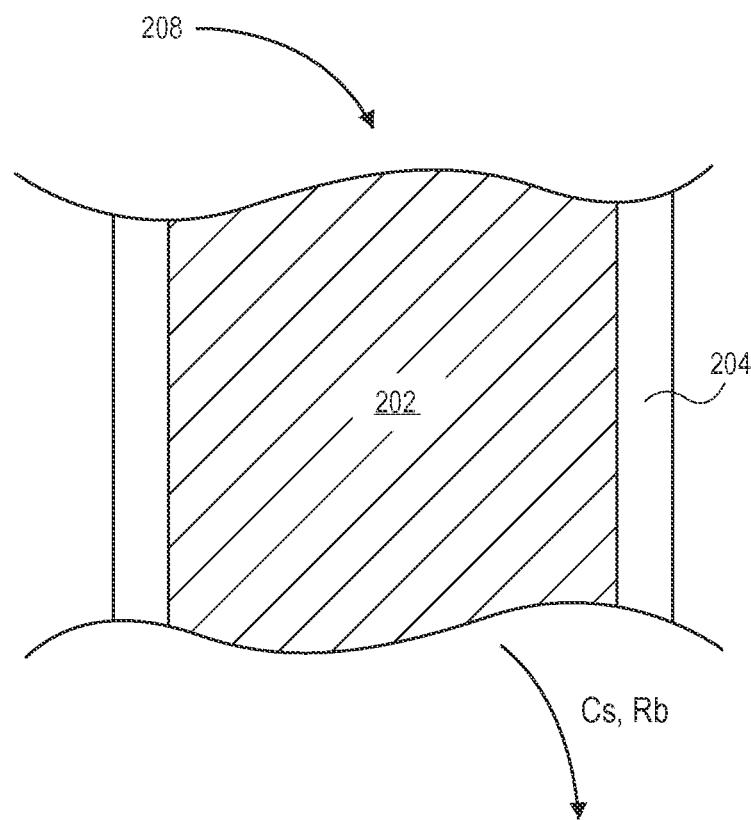
FIG. 2C illustrates a cross-sectional view of running a liquid sample through a separation column including alkali metal-loaded CST or CST-like material, in accordance with an embodiment of the present invention.

In an embodiment, extracting the alkali metal species from the CST or CST-like material includes running a liquid sample 208 through a separation column 204 including alkali metal-loaded CST or CST-like material 202, as depicted in FIG. 2C.

Due to the great affinity of the CST or CST-like materials for high-value alkali elements, extraction of the alkali metal species may not be straightforward. Thus, in an aspect of the present invention, economical technologies suitable to release the target elements (e.g., for sale) are provided below.

In an embodiment, extracting the alkali metal species from the CST or CST-like material includes heating a high-value alkali loaded CST to at least partially release the alkali metal constituents back into a solution, e.g., a second liquid.

In an embodiment, extracting the alkali metal species from the CST or CST-like material includes adjusting the pH during loading of the material (e.g., at the scavenging operation, to a value between 3 and 8 to enhance loading capacity of CST-like materials and, subsequently, exposing the loaded material to a solution with a pH value lower than 3 or above 8 to cause a portion of the high-value alkali metal loading to be released into a solution, e.g., into a second liquid.

In an embodiment, extracting the alkali metal species from the CST or CST-like material includes exposing the CST or CST-like material to brines containing an ion which can displace the scavenged alkali metal species, e.g., displace Li, Rb, or Cs. In one such embodiment, the ion is a species such as, but not limited to, an ammonium ion, various alkyl-ammonium ions, a potassium ion, or a silver ion. The ion may release a portion of the target metals into a solution. e.g., into a second liquid. In a particular embodiment relating to geothermal brines and various industrial applications, the ion concentration may approach halite saturation (e.g., 220,000 parts per million total dissolved solids). In other applications, salinities may range all the way down to a level considered potable (e.g., typically several hundred parts per million dissolved solids).

Figure 3:
FIG. 3 illustrates oxidation processes involving various multivalent metal cations, in accordance with an embodiment of the present invention.
Figure 3:
Figure 3:
Figure 3:

In an embodiment, extracting the alkali metal species from the CST or CST-like material includes pre- or post-loading some of the ion exchange sites in the CST or CST-like materials with the reduced form of a multivalent metal cation (e.g., manganese (II) (Mn++)). The reduced form of the multivalent metal cation is then oxidized in a controlled fashion (e.g., to Mn+4, for example) so that a portion of the alkali metals loaded onto the CST or CST-like materials are expelled. Other embodiments include, but are not limited to, the use of $Fe^{2+}$ (oxidized to $Fe^{3+}$), $Cr^{2+/3+}$ (oxidized to $Cr^{IV}$) and $Sn^{2+}$ (oxidized to $Sn^{4+}$), as depicted in FIG. 3. Additionally, embodiments may include the use of the starting ions $Cu^{2+}$, $V^{3+/4+}$, $Tb^{3+}$, and $Ce^{3+}$. In an embodiment, ozone ($O_3$) is used as the oxidizing agent. In an alternative embodiment, a reduced form of a multi-valent cation (e.g., $Fe^{2+}$, Mo cations, or W cations) are initially incorporated into a zeolite-like lattice structure, and then oxidized once the zeolite is loaded with the target metals.

In an embodiment, extracting the alkali metal species from the CST or CST-like material includes exposing the alkali-loaded CST or CST-like materials to other strong alkali-metal complexing agents (e.g., exposing to crown ethers) to back-extract a portion of the alkali metals into a fluid phase. In one such embodiment, the effectiveness of the complexing agent is enhanced by adding a cation to substitute on the exchanges sites of the CST-like material when a high-value alkali metal cation is extracted there from.

In accordance with an embodiment of the present invention, following the extracting, the method of recovering alkali metals further includes reusing the CST or CST-like material for another scavenging and extracting process.

In an alternative embodiment, the extracting is not performed. As an example, in an emergency situation such as a radiation leak, the CST or CST-like material may be added to a site where the leak occurred. The CST or CST-like material may be loaded, inhibiting the dangers of radioactive material, and may be left in place without necessarily recovering the trapped species or the CST or CST-like material.

As a specific exemplary experimental embodiment of the present invention, the following details are provided to illustrate an extraction process. Cesium (Cs) and rubidium (Rb) were extracted by a CST or CST-like material in a separation column. Upon washing the CST or CST-like material with water, the Cs and Rb remained in the CST or CST-like material. However, upon exposure to 4.1 grams/milliliter of an aqueous solution of ammonium carbonate ($(NH_4)_2CO_3$), the Cs and Rb were displaced from the CST or CST-like material. In a particular embodiment, ammonium cations ($NH_4^+$) from the ($(NH_4)_2CO_3$) displaced the Cs and Rb in the CST or CST-like material. In another particular embodiment, the aqueous solution of ammonium carbonate was heated to approximately 75 degrees Celsius. Then, in order to recover the CST or CST-like material for re-use, heating the solution to the boiling point of water may be used to remove the $NH_4^+$, boiling off ammonia ($NH_3$) and carbon dioxide ($CO_2$). In an alternative embodiment, ammonium chloride ($NH_4Cl$) is used as a source of $NH_4^+$.

Thus, methods of recovering alkali metals have been disclosed. In accordance with an embodiment of the present invention, a method of recovering alkali metals includes providing a CST or CST-like material. The alkali metal species is scavenged from the liquid mixture by the CST or CST-like material. The alkali metal species is extracted from the CST or CST-like material. In one embodiment, the scavenging, by the CST or CST-like material, includes running the liquid mixture through a separation column loaded with the CST or CST-like material.

What is claimed is:

1. A method of recovering alkali metals, the method comprising:
   providing an alkali metal scavenger material;
   scavenging, by the alkali metal scavenger material, alkali metal species from a liquid mixture comprising the alkali metal species; and
   extracting the alkali metal species from the alkali metal scavenger material;
   wherein extracting the alkali metal species from the alkali metal scavenger material comprises exposing the alkali metal scavenger material to an ion selected from the group consisting of ammonium ions, alkyl-ammonium ions, and silver ions.

2. The method of claim 1, wherein the scavenging, by the alkali metal scavenger material, comprises running the liquid mixture through a separation column loaded with the alkali metal scavenger material.

3. The method of claim 1, wherein the scavenging, by the alkali metal scavenger material, comprises scavenging the alkali metal species from a brine.

4. The method of claim 1, wherein extracting the alkali metal species from the alkali metal scavenger material comprises heating the alkali metal scavenger material to release the alkali metal species into a solution.

5. The method of claim 1, wherein extracting the alkali metal species from the alkali metal scavenger material comprises exposing the alkali metal scavenger material to a solution with a pH different from the pH of the liquid mixture comprising the alkali metal species.

6. The method of claim 1, wherein extracting the alkali metal species from the alkali metal scavenger material further comprises exposing the alkali metal scavenger to an aqueous solution of ammonium carbonate (($NH_4)_2CO_3$) at a temperature of approximately 75 degrees Celsius.

7. The method of claim 1, wherein extracting the alkali metal species from the alkali metal scavenger material comprises incorporating a reduced form of a multivalent metal cation species into the alkali metal scavenger material and, subsequently, oxidizing the multivalent metal cation species.

8. The method of claim 1, wherein extracting the alkali metal species from the alkali metal scavenger material further comprises exposing the alkali metal scavenger material to an alkali-metal complexing agent.

9. The method of claim 1, further comprising:
reusing the alkali metal scavenger material for another scavenging and extracting process.

10. A method of recovering alkali metals, the method comprising:
providing a liquid mixture comprising alkali metal species;
combining the liquid mixture with a alkali metal scavenger material; and
extracting the alkali metal species from the alkali metal scavenger material;
wherein extracting the alkali metal species from the alkali metal material comprises incorporating a reduced form of a multivalent metal cation species into the alkali metal scavenger material and, subsequently, oxidizing the multivalent metal cation species.

11. The method of claim 10, wherein combining the liquid mixture with the alkali metal scavenger material comprises running the liquid mixture through a separation column loaded with the alkali metal scavenger material.

12. The method of claim 10, wherein combining the liquid mixture with the alkali metal scavenger material comprises combining alkali metal scavenger material with a brine.

13. The method of claim 10, wherein extracting the alkali metal species from the alkali metal scavenger material comprises heating the alkali metal scavenger material to release the alkali metal species into a solution.

14. The method of claim 10, wherein extracting the alkali metal species from the alkali metal scavenger material comprises exposing the alkali metal scavenger material to a solution with a pH different from the pH of the liquid mixture comprising the alkali metal species.

15. The method of claim 10, wherein extracting the alkali metal species from the alkali metal scavenger material comprises exposing the alkali metal scavenger material to a brine comprising ions selected from the group consisting of ammonium ions, alkyl-ammonium ions, potassium ions, and silver ions.

16. The method of claim 10, wherein exposing the alkali metal scavenger material to the brine comprises exposing the alkali metal scavenger material to an aqueous solution of ammonium carbonate (($NH_4)_2CO_3$) at a temperature of approximately 75 degrees Celsius.

17. The method of claim 10, wherein extracting the alkali metal species from the alkali metal scavenger material comprises exposing the alkali metal scavenger material to an alkali-metal complexing agent.

18. The method of claim 10, further comprising:
reusing the alkali metal scavenger material for another combining and extracting process.

* * * * *